June 20, 1950     G. LEVESQUE DU ROSTU     2,512,065
MOTOR CAR ELECTROMAGNETIC CLUTCH
Filed Oct. 26, 1946
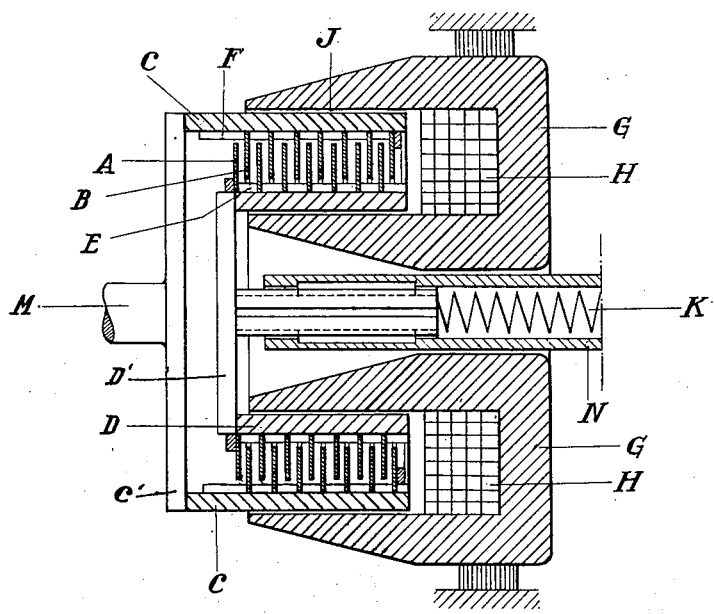
INVENTOR
Georges Levesque du Rostu
By Robert E. Burns
ATTORNEY Patented June 20, 1950

2,512,065

UNITED STATES PATENT OFFICE 2,512,065

MOTORCAR ELECTROMAGNETIC CLUTCH

Georges Levesque du Rostu, Paris, France, assignor to Societe Anonyme Andre Citroen, Paris, France, a body corporate of France Application October 26, 1946, Serial No. 706,024
In France March 14, 1946

1 Claim. (Cl. 192—84)

The device in accordance with the invention consists of an electric-gear that comes on gradually and without any sliding contacts.

Electromagnetic clutches are known of which the coaxial driving and driven parts which are axially movable with respect to each other carry each a set of rings which are interleaved with one another and which are pressed into engagement by the magnetic flux generated by an electromagnet mounted in the one of said parts.

My invention consists primarily in using a fixed electromagnet coil so as to do away with all sliding contact members such as brushes or slip rings and to make it possible contingently to run the clutch in oil.

My invention moreover consists in enclosing the rings in the yoke, which leads to the result that the flux is practically closed (in fact, the lines of force do not follow strictly identical paths, but since they go through an unsaturated iron mass the differences are unimportant) and has the same value in all the ring pairs due to the fact that in the engaged position of the clutch the rings, instead of being pressed together to a single pack, engage one another by pairs; this is a very important feature since the liability of the clutch to grip, which is common to all multi-disc clutches, is eliminated.

With this end in view, the coil is arranged in a fixed manner opposite the two ring sets and the yoke is given a U-shaped section between the flanges of which a pair of wheel rims are rotatably mounted which are rigid respectively with the driving and the driven shafts and which carry the related sets of interleaved rings.

Resilient means are provided to permanently urge the two ring-carrying rims towards the disengaged position of the clutch.

A form of execution of my invention is illustrated diagrammatically in the single figure of the accompanying drawing.

In the figure, the connection is made through rings such as A and B that are fixed rigidly for their turning motion respectively with the parts C and D through splines such as E and F that engage in grooves arranged at the periphery of the rings.

The parts C and D are carried respectively by discs C' and D' on the two shafts M and N to be interconnected.

These two cylindrical parts revolve inside a round electro-magnet G that is designed to set up the magnetic field by means of which the rings are held in contact.

This electro-magnet is formed by a stationary annular iron piece with a U-shaped section in which is housed an energizing coil H wherethrough the current flows that is required for the operation of the connecting-gear.

An air-gap J is arranged between the parts C and D and the electro-magnet, and it may be narrow so as to avoid the setting up of too strong an energizing current.

The wheel rim D is rigid with a shaft which is urged permanently towards the disengaged position of the clutch by a spring K.

In regard to operation in practice, with the part C cottered on the motor shaft and the current flowing in the coil, the magnetic field is closed through the air-gaps J over the rings A and B that are attracted by the magnetic flux prevailing in the rings (in all of which its intensity is substantially the same owing to their being arranged between the inner and the outer flange of the U-sectional ring yoke) and drawn together while compressing the spring K, whereby they become effective to drive the ring-carrying wheel rim D and the shaft N rigid therewith.

The current may be given an intensity and follow a law such in its establishment that the transmission of motion to the driven shaft may be effected in a gradual manner, and for this purpose a rheostat may be included in the circuit for satisfactory control of the connecting gear.

In such equipment the inertia of the parts in movement is kept down to a minimum with only the parts essential for the revolving action being in motion.

What I claim is:

A clutch comprising a pair of coaxial, diametrically unequal discs of which the one is movable axially with respect to the other, an axially overhanging rim on each disc, a set of radially extending magnetic metal rings on the outside of the inner rim and the inside of the outer rim, the rings in the one set being interleaved with the ones in the other set, a fixed electromagnet coil arranged in axial alignment with the two ring sets, a U-sectional ring yoke straddling said electromagnet coil together with the two rims and the rings rigid therewith and a spring urging the one of the discs axially towards the disengaged position of the clutch.

GEORGES LEVESQUE du ROSTU.

REFERENCES CITED

The following references are of record in the file of this patent:

UNITED STATES PATENTS

| Number | Name | Date |
|---|---|---|
| 942,188 | Ravenshaw | Dec. 7, 1909 |
| 1,787,225 | Wittkuhns | Dec. 30, 1930 |

FOREIGN PATENTS

| Number | Country | Date |
|---|---|---|
| 425,383 | Germany | Feb. 17, 1926 |

OTHER REFERENCES

Ryba A. P. C. publication #314,170, May 18, 1943.